United States Patent [19]

Sims, Jr.

[11] Patent Number: 5,385,300
[45] Date of Patent: Jan. 31, 1995

[54] PLANT WATERING DEVICE

[76] Inventor: Earnest Sims, Jr., 46 Brunswick Rd., Depew, N.Y. 14043

[21] Appl. No.: 919,870
[22] Filed: Jul. 27, 1992
[51] Int. Cl.⁶ ............................................. B05B 1/20
[52] U.S. Cl. ........................................ 239/74; 239/267; 239/276; 239/279; 239/562
[58] Field of Search ............... 239/71, 74, 542, 547, 239/562, 579, 569, 450, 451, 456, 437, 438, 436, 443, 276, 279, 285, 267; 137/558, 625.33, 625.38; 405/39, 40, 47

[56] References Cited

U.S. PATENT DOCUMENTS

| 224,513 | 2/1880 | Burdon | 239/267 |
|---|---|---|---|
| 464,550 | 12/1891 | Bowman | 239/562 |
| 1,604,189 | 10/1926 | Nelson | 405/39 |
| 2,709,624 | 5/1955 | MacChesney | 239/267 |
| 2,755,985 | 7/1956 | Finegan | 239/267 |
| 3,876,146 | 4/1975 | Pacheco | 239/450 |
| 3,899,135 | 8/1975 | O'Brian | 239/562 |
| 4,452,397 | 6/1984 | Barton | 239/547 |
| 4,930,934 | 6/1990 | Adkins | 239/569 |

FOREIGN PATENT DOCUMENTS

| 23798 | 8/1935 | Australia | 239/562 |
|---|---|---|---|
| 1281008 | 4/1963 | France | 239/562 |
| 8500499 | 2/1985 | WIPO | 239/542 |

Primary Examiner—Andres Kashnikow
Assistant Examiner—Christopher G. Trainor

[57] ABSTRACT

The invention comprises a liquid storage container having a plant feeder outlet and a fluid transmission outlet arranged to accept a tube, the distance it inserts into the fluid transmission outlet determining the volume of fluid which is allowed to flow from the plant feeder outlet. The invention includes a system of remote plant feeder members connected through said tube and allowing delivery of controlled volumes of fluid to one or more plants.

18 Claims, 3 Drawing Sheets

PLANT WATERING DEVICE

FIELD OF THE INVENTION

This application relates to a novel device having particular utility for the storage of liquids and/or the controlled, delivery of stored liquids to a plant growth environment over a period of time.

BACKGROUND OF THE INVENTION

In the cultivation of plant life, it is essential that they be timely provided with water and/or other liquid nourishment. Traditionally, the gardener relies upon nature to provide periodic rainfall for plants under cultivation but, when nature doesn't respond or cultivation is undertaken in an area unaffected by rainfall, the gardener must provide water and/or other liquid nourishment to the plants. Typically, water and/or other liquids are provided by portable sprayers or cans or even spraying from hoses driven from feeding water. Such methods are time consuming and can involve heavy and tiring labor. In addition the spraying of plants directly involves the use of significantly more liquid than may be necessary and can cause damage to plants. Thus it is preferred to apply the water and/or liquid directly to the roots or the soil adjacent the roots of a plant to allow the most efficient utilization of the liquid.

There is a continuing need for an efficient means to provide water to the roots of a plant over a prolonged period of time. There is also a continuing need to provide liquids containing nutrients and the like to the plant root structure.

An object of the present invention is to provide a novel device for providing liquids such as water, with or without added nutrients and the like, to a plant.

Another object of the invention is to provide a novel device that will store liquids and the like and provide same to the plant in a controlled manner.

A still further object of the invention is to provide a device which allows minimal maintenance and will automatically provide liquids to a plant in preset volumes. These and other objects of the invention will become apparent from the following description of the invention.

SUMMARY OF THE INVENTION

The instant invention features a novel plant watering system arranged in a combination comprising a container for storing a fluid; a hollow, fluid distribution member that has an inlet in fluid communication with a lower portion of the storage container and contains a plant feeder outlet and a fluid transmission outlet; and a remote plant feeder member. The fluid transmission outlet is configured to have an interior surface that engages the exterior surface of a fluid transmission tube that can be inserted through the fluid transmission outlet into the distribution member. The fluid distribution member also contains a plant feeder outlet, an opening of which is arranged along the path the fluid transmission tube follows into the distribution member, such that the opening is partially or fully closed by the surface of the tube in response to the distance the tube is inserted through the fluid transmission outlet into the distribution member. Thus, as fluid flows from the storage container to the distribution member it will flow out the plant feeder outlet in an amount controlled by the distance the tube is inserted into the distribution member.

In one embodiment, the tube extends from the fluid transmission outlet to a remote plant feeder member. The remote plant feeder member has a fluid transmission inlet with an interior surface configured to engage the exterior surface of the tube and a plant feeder outlet, arranged in the manner of the plant feeder outlet of the distribution member such that the amount of fluid flowing from the outlet is controlled by varying the distance the tube is inserted through the fluid transmission inlet into the remote plant feeder member.

In another embodiment of the invention the plant feeder member also comprises a fluid transmission outlet for distribution of fluid to a further plant feeder member or the like. The fluid transmission outlet of the plant feeder member may be configured to engage the exterior surface of a tube so that fluid flow through the plant feeder outlet can be controlled by the distance the tube is inserted into the outlet and/or the insertion of the tube through the inlet.

In still another embodiment of the invention a fluid transmission tube may be blocked or comprise a rod, plug or the like, such that liquid flow through the plant feeder outlet in a plant feeder member or distribution member can be controlled but fluid does not flow through the fluid transmission outlet.

In typical operation of the invention the liquid storage container is positioned such that the bottom portion thereof is at or above soil level, with the plant feeder outlet of the hollow distribution member being proximate the area where the stem of a plant emerges from the soil. A fluid transmission tube is arranged to extend from the fluid transmission outlet of the hollow distribution member to a remote plant feeder member positioned proximate a second plant where fluid is desired to be delivered and so forth. It should be understood that the distribution member, tubes and plant feeder members can also be arranged below soil level if desired.

The tube may also comprise one or more diverter or other couplings that allow division of the fluid flow through the fluid transmission tube to other plant feeder members. Thus, fluid flows freely from the container through the distribution member and the fluid transmission tube to the various remote plant feeder members, controlled by the size of the tubing and the fluid transmission inlets and outlets.

The volume of fluid flow, through the plant feeder outlet of the hollow distribution member or a remote plant feeder member is controlled by varying the distance that the tube inserts into the member. Thus, insertion of the tube to various prescribed distances can allow controlled partial or full closure of a plant feeder outlet as desired for the particular area receiving the liquid. For example, the plant feeder outlet at the distribution member can be adjusted to allow more or less fluid flow than a remote plant feeder member or other plant feeder members. It should be understood that fluid flow can be the same, different, full, partial or even blocked at each plant feeder outlet.

A plant feeder member may also contain a fluid transmission outlet configured to engage the exterior surface of the tube and/or a further tube to allow transmission of fluid to a further plant feeder member and the like.

The storage container, distribution member and plant feeder members are generally manufactured to a desirable ornamental appearance. Thus, the storage compartment may be in the form of a plant or any other desirable ornamental object. Generally the storage container, distribution member and plant feeder members are manufactured from a ceramic or plastic material or the like. The tubing is generally formed from a flexible plastic material such as neoprene or the like.

The lower portion of the container is typically formed with the hollow distribution member being an integral part thereof but such may be a separate member. The placement of the outlet to the distribution member is typically at a lower portion of the container reservoir to allow gravity flow of the liquid in the container thereto. It should be understood that it is contemplated as within the invention to include pressurized flow of fluid through the system.

Generally it is desirable to have a means for indicating the level of fluids in the container. The container may be transparent to allow visual observation of the fluid level and/or may contain a float indicator or the like. One particularly desirable indicator is a float comprising a rod that extends through the top of the container. The amount of rod extending from the container provides convenient visual indication of fluid level

DESCRIPTION OF THE PREFERRED EMBODIMENTS

Figure 1:
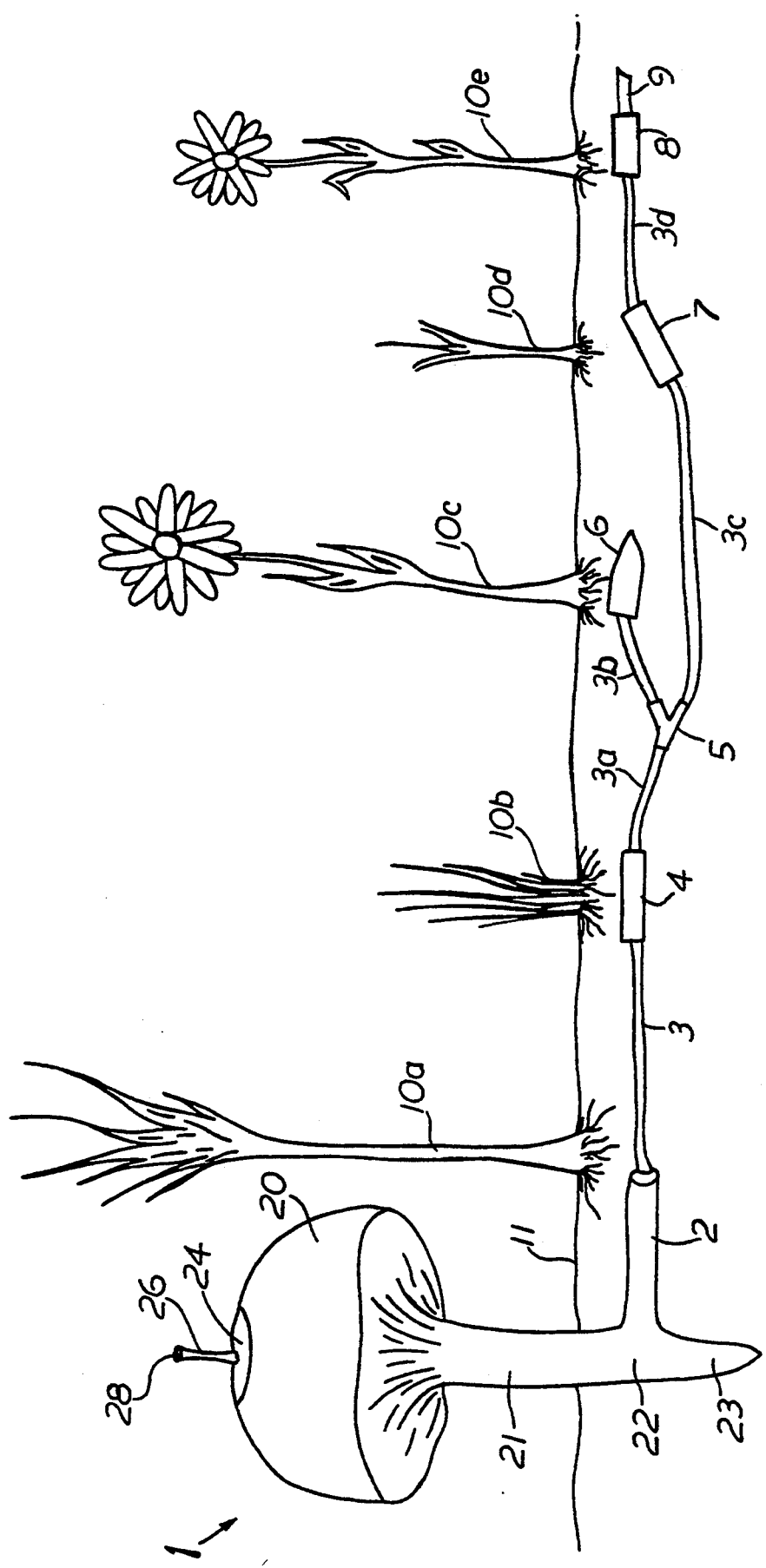
FIG. 1 is a perspective view of a plant watering system of the invention in an operating position.

Referring now to the FIG. 1 wherein is illustrated an embodiment of the plant watering system of the invention, comprising storage container 1, ornamentally illustrated in the general form of a mushroom. The storage container comprises an upper reservoir portion 20, middle reservoir portion 21, lower reservoir portion 22 and bottom spike 23. In the illustrated embodiment hollow distribution member 2 is configured as integral with lower reservoir portion 22 of the storage container. The upper reservoir portion has a filling inlet with removable cover 24. Float stick 26, is illustrated as having indicator knob 28, and extends through hole 29 in cover 24 to the exterior of the storage container.

Transmission tube 3 extends from hollow distribution member 2 to first plant feeder member 4. Tube 3a extends from plant feeder member 4 to diverter coupling 5 whereupon tubes 3b and 3c extend to second and third plant feeder members 6 and 7 respectively. Tube 3d extends from third plant feeder member 7 to fourth plant feeder member 8 comprising plug 9.

In the illustrated system, storage container 1 is arranged in an embodiment such that lower reservoir 22 is below soil level 11, with hollow distribution member 2 being arranged proximate the roots of plant 10a. Plant feeder members 4,6,7 and 9 are similarly arranged proximate the roots of plants 10b–10e below soil level. It should be understood that it is contemplated as within the invention that lower reservoir 22 and/or hollow distribution member 2 be also arranged above soil level 11 and that plant feeder members 4,6,7 and 9 be arranged above or below soil level as desired. In the operation of the system of the invention, it is not necessary for plant feeder members to be at the same level with each other or the hollow distribution member. Preferably, the system will rely upon gravity flow of fluid from storage of fluids at a higher level to plant feeder outlets of plant feeder members arranged at lower levels. It is, however, contemplated that pressure can be imposed upon the system for fluid flow that does not rely upon gravity alone.

Figure 2:
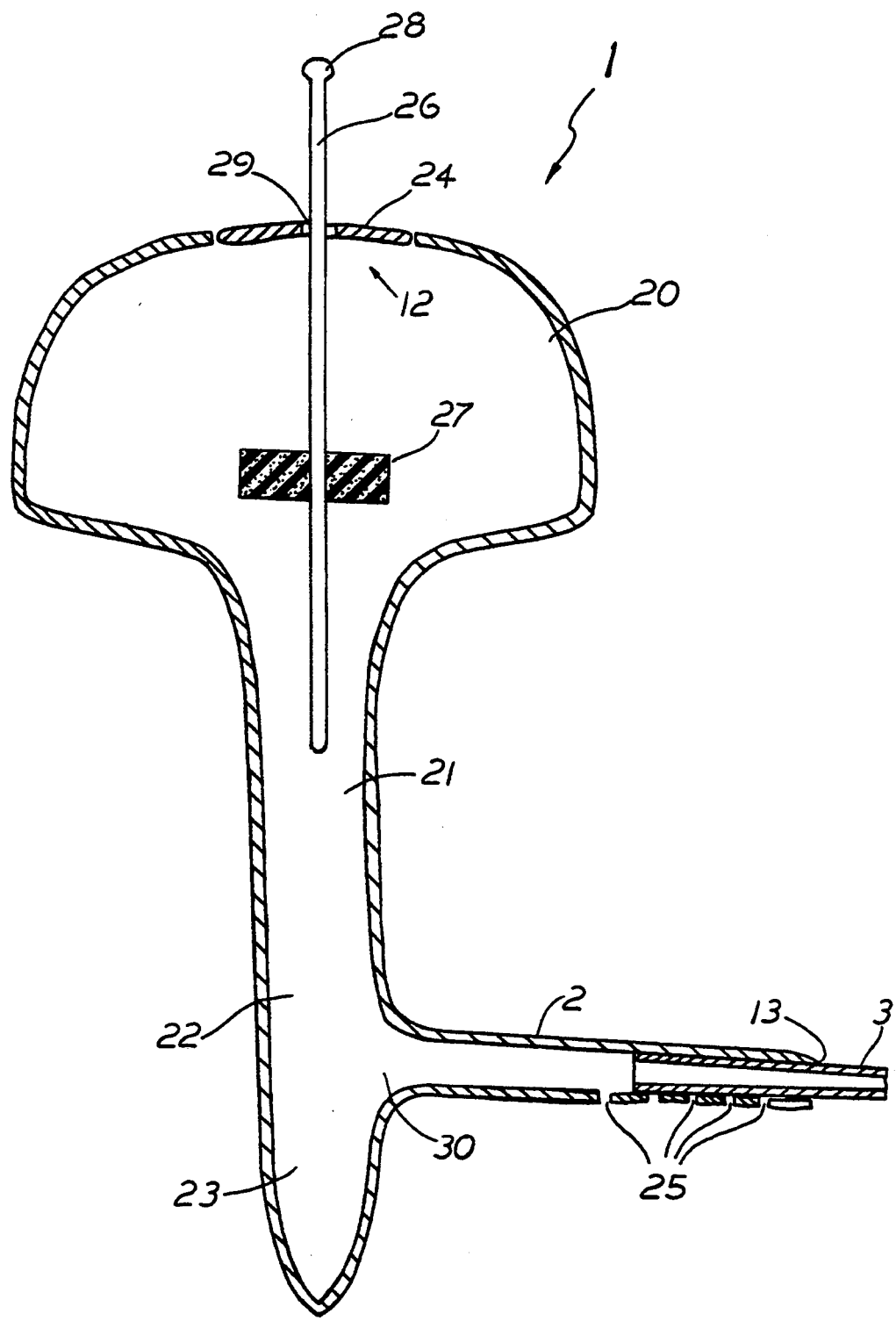
FIG. 2 is a sectional view of a liquid storage container with elongated member and fluid transmission tube.

FIG. 2 provides a sectional view of storage container 1 with integral hollow distribution member 2. Therein, float stick 26 is illustrated as extending through hole 29 and having float 27 attached thereto. Float 27 is comprised of a material which will float on the surface of fluids in the container such that upward and downward movement of the float causes the stick to move upwardly and downwardly through hole 29 in response to the fluid level within upper reservoir 20.

Fluid is added to storage container 1 through inlet 12 which has a removable cover 24. Fluid flows from upper reservoir portion 20 to middle reservoir portion 21 and lower reservoir portion 22, through inlet 30 to hollow distribution member 2. Hollow distribution member 2 contains a plant feeder outlet which comprises a series of holes 25. An end of fluid transmission tube 3 is inserted into fluid transmission outlet 13 of hollow distribution member 2 such that the exterior surface of tube 3 engages an interior surface of the hollow distribution member to form a fluid seal. Holes 25 are arranged such that the number of holes covered and/or the opening of said holes varies with the distance said end of said tube is inserted into said fluid transmission outlet. Thus, the opening of the plant feeder outlet varies with the distance said end of said tube is inserted into said fluid transmission outlet. It should be understood that it is also contemplated as within the invention that the plant feeder outlet comprise one or more slots, elongated holes or the like that may be similarly fully or partially covered.

Figure 3:
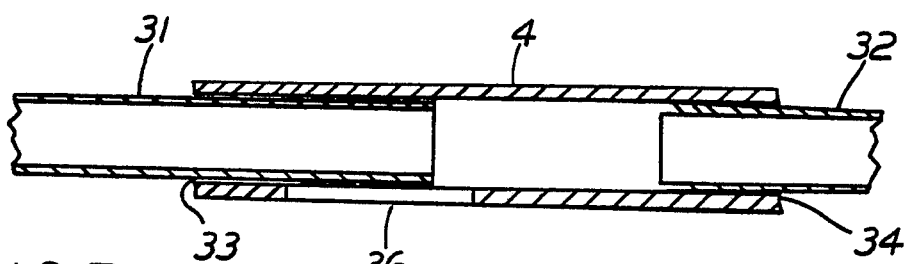
FIGS. 3 through 7 are sectional views of various plant feeder members identified in FIG. 1.

FIGS. 3–7 illustrate various embodiments of plant feeder members of the invention. In FIG. 3, plant feeder member 4 comprises an elongated hollow member having slot 36 therein. Incoming fluid transmission tube 31 inserts into inlet 33 and engages an interior surface of the plant feeder member such that the opening of the slot varies with the distance the incoming tube inserts into the member. Outgoing tube 32 is inserted in outlet 34.

Figure 4:
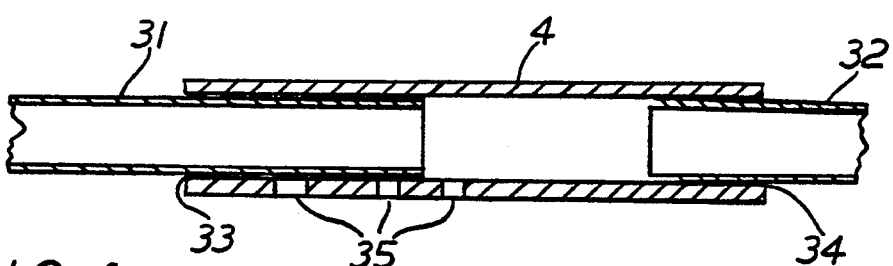

In FIG. 4, plant feeder member 4 comprises an elongated hollow member having a series of holes 35 therein. Incoming fluid transmission tube 31 inserts into inlet 33 and engages an interior surface of the plant feeder member such that the number of holes covered and/or the extent of covering a hole, varies with the distance the incoming tube inserts into the member. Outgoing tube 32 is inserted in outlet 34.

Figure 5:
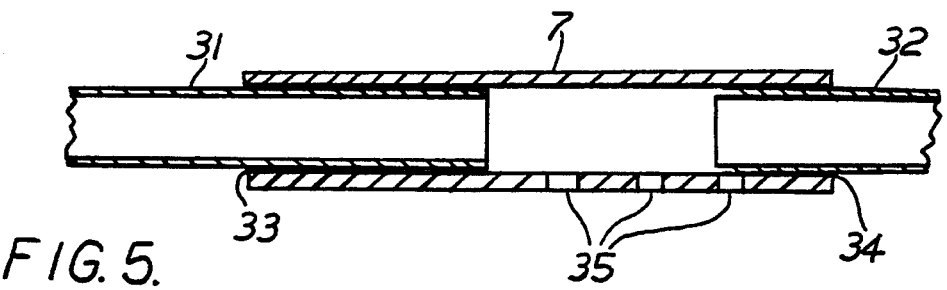

In FIG. 5, plant feeder member 7 comprises an elongated hollow member having a series of holes 35 therein. Incoming fluid transmission tube 31 inserts into inlet 33 and outgoing tube 32 is inserted in outlet 34 which engages an interior surface of the plant feeder member such that the number of holes covered and/or the extent of covering a hole, varies with the distance the outgoing tube inserts into the member.

Figure 6:
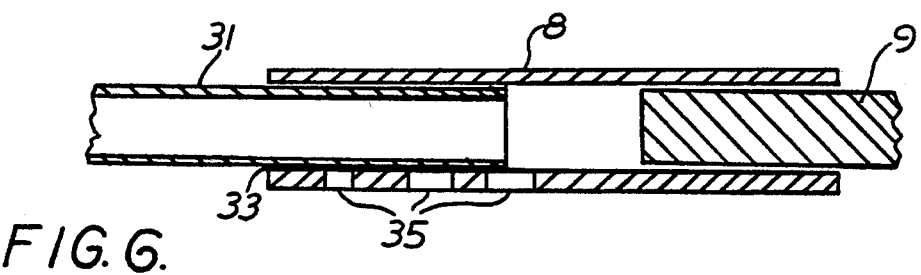
Figure 7:
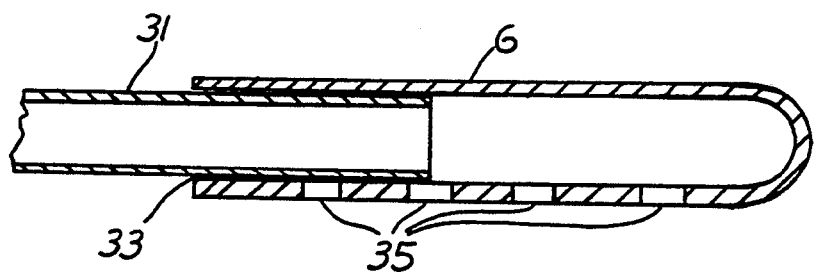

In FIG. 6, plant feeder member 8 comprises the plant feeder member of FIG. 4 being an elongated hollow member having a series of holes 35 therein. Incoming fluid transmission tube 31 inserts into inlet 33 and engages the interior surface of the plant feeder member such that the number of holes covered and/or the extent of covering a hole, varies with the distance the outgoing tube inserts into the member. Outlet 34 comprises plug 9.

In FIG. 6, plant feeder member 6 comprises an elongated hollow member having a series of holes 35 therein. Incoming fluid transmission tube 31 inserts into inlet 33 and engages the interior surface of the plant feeder member such that the number of holes covered and/or the extent of covering a hole, varies with the distance the outgoing tube inserts into the member.

I claim:

1. A plant feeder system comprising a container for storing a fluid, a fluid distribution member, a remote plant feeder member and a tube for transmitting said fluid from said fluid distribution member; said fluid distribution member being contiguous with said container and comprising a hollow chamber, having an inlet in fluid communication with a lower portion of said container, a plant feeder fluid outlet and a fluid transmission outlet; said fluid transmission outlet being dimensioned to insertingly accept an end portion of said tube and comprising an interior surface configured to engage the exterior surface of said end portion of said tube inserted therein; said plant feeder outlet of said fluid distribution member comprising an opening, being arranged such that the size of said opening of said plant feeder outlet of said fluid distribution member varies with the distance said end portion of said tube is axially inserted into said fluid transmission outlet; said remote plant feeder member having a plant feeder outlet and a fluid transmission inlet; said fluid transmission inlet of said remote plant feeder member being dimensioned to insertingly accept an end portion of a fluid transmission tube and comprising an interior surface configured to engage the exterior surface of said an end portion of a fluid transmission tube inserted therein and said plant feeder outlet of said plant feeder member comprising an opening, being arranged such that the size of said opening of said plant feeder outlet varies with the distance said an end portion of said fluid transmission tube is axially inserted into said fluid transmission inlet of said remote plant feeder member.

2. The system of claim 1 comprising means for indicating liquid level in said container.

3. The system of claim 1 wherein said fluid distribution member is elongated.

4. The system of claim 1 wherein said opening is arranged to be progressively covered as said end portion of said tube is axially inserted into said fluid transmission outlet.

5. The system of claim 1 wherein said opening comprises a plurality of discrete openings arranged to be progressively covered as said end portion of said tube is axially inserted into said fluid transmission outlet.

6. The system of claim 1 wherein said fluid comprises water.

7. A container for storage of fluids comprising, a fluid storage container; a hollow, distribution member having an inlet in fluid communication with a lower portion of said fluid storage container, a plant feeder fluid outlet and a fluid transmission outlet; said fluid transmission outlet comprising an interior surface configured to engage the exterior surface of an end portion of a tube inserted therein; said distribution member comprising an interior opening in fluid communication with said plant feeder outlet, which is arranged such that axial insertion of said end portion of said tube into said fluid transmission outlet engages said opening, and the volume of fluid flowing through said plant feeder outlet from said opening in said interior surface of said fluid transmission outlet varies with the distance said end portion of said tube is axially inserted into said fluid transmission outlet.

8. The combination of claim 7 comprising means for indicating liquid level in said storage container.

9. The combination of claim 8 wherein said means for indicating liquid level comprises a float indicator.

10. The combination of claim 7 wherein said storage container is transparent.

11. The combination of claim 7 wherein said distribution member is elongated.

12. The combination of claim 7 wherein said opening is arranged to be progressively covered as said end portion of said tube is axially inserted into said fluid transmission outlet.

13. The combination of claim 7 wherein said interior opening comprises a plurality of discrete openings arranged to be progressively covered as said end portion of said tube is a axially inserted into said fluid transmission outlet.

14. A remote plant feeder member comprising a fluid transmission inlet and a plant feeder fluid outlet; said fluid transmission inlet having an interior surface configured to engage the exterior surface of an end portion of a tube; said plant feeder member comprising an interior opening in fluid communication with said plant feeder outlet, which is arranged such that axial insertion of said end portion of said tube into said fluid transmission inlet engages said opening, and the volume of fluid flowing through said plant feeder outlet from said opening varies with the distance said end portion of said tube is axially inserted into said fluid transmission inlet.

15. The plant feeder member of claim 14 wherein said opening comprises a plurality of discrete openings arranged to be progressively covered as said an end portion of said tube is inserted into said fluid transmission inlet.

16. The plant feeder member of claim 14 comprising a fluid transmission outlet.

17. The plant feeder member of claim 16 wherein said fluid transmission outlet is configured to engage the exterior surface of another tube and said plant feeder outlet is arranged such that the volume of fluid flow therethrough varies with the distance said another tube is inserted into said fluid transmission outlet.

18. The combination comprising a container for storage of fluids; a hollow, distribution member contiguous with said container, having an inlet in fluid communication with a lower portion of the storage container and having a plant feeder fluid outlet and a fluid transmission outlet; and a remote plant feeder member having a plant feeder outlet and a fluid transmission inlet; said fluid transmission outlet of said distribution member comprising an interior surface configured to engage the exterior surface of an end of a tube inserted therein and co-acting with said plant feeder outlet of said distribution member such that fluid flow through said plant feeder outlet of said distribution member varies with the distance said end of said tube is inserted into said fluid transmission outlet; said fluid transmission inlet of said plant feeder member comprising an interior surface configured to engage the exterior surface of another end of said tube inserted therein and co-acting with said plant feeder outlet of said plant feeder member such that fluid flow through said plant feeder outlet of said distribution member varies with the distance said another end of said tube is axially inserted into said fluid transmission inlet.

* * * * *